E. DANNER.
PROCESS OF FORMING GLASS ARTICLES.
APPLICATION FILED JULY 16, 1917.
1,269,791.
Patented June 18, 1918.
2 SHEETS—SHEET 2.
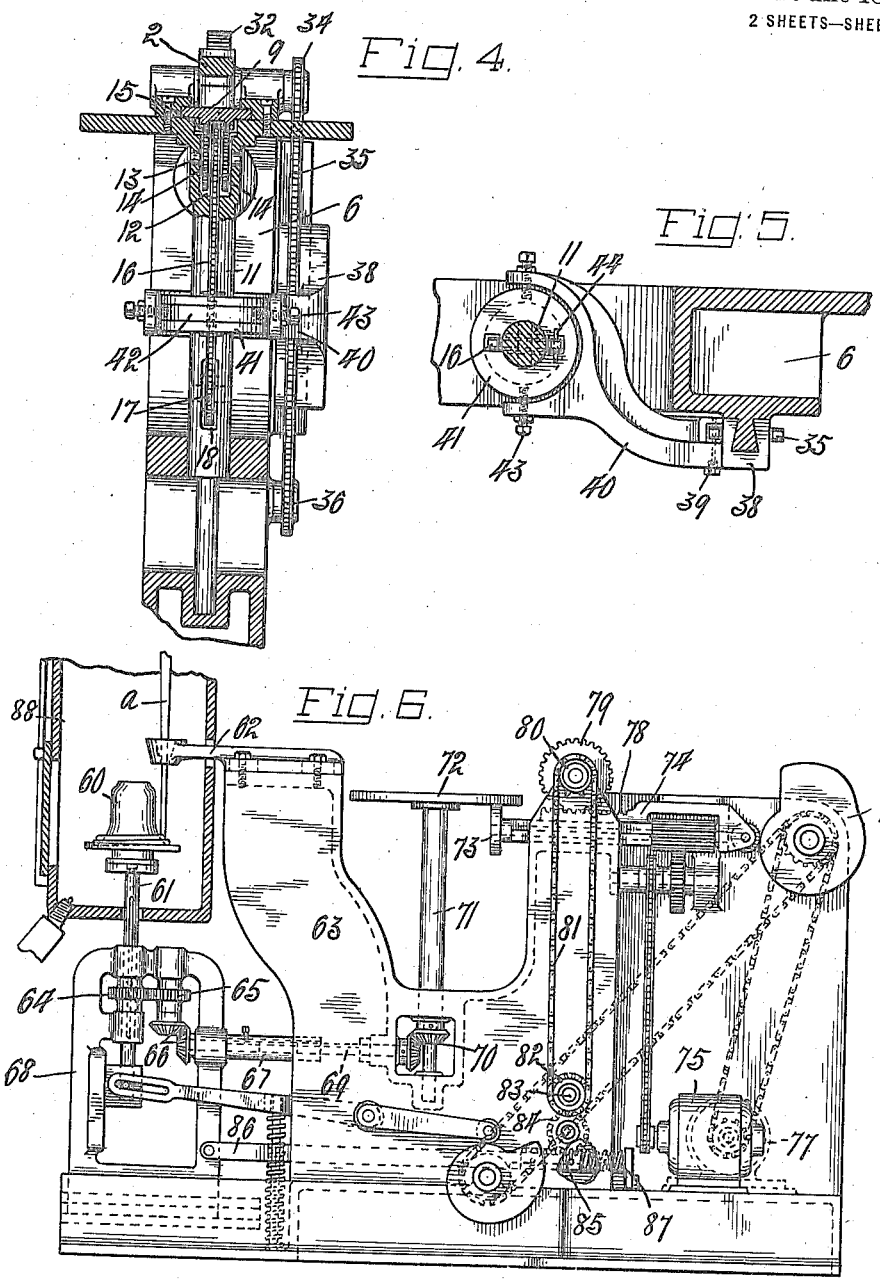
INVENTOR
Edward Danner,
By Owen, Owen & Crampton,
His attys.

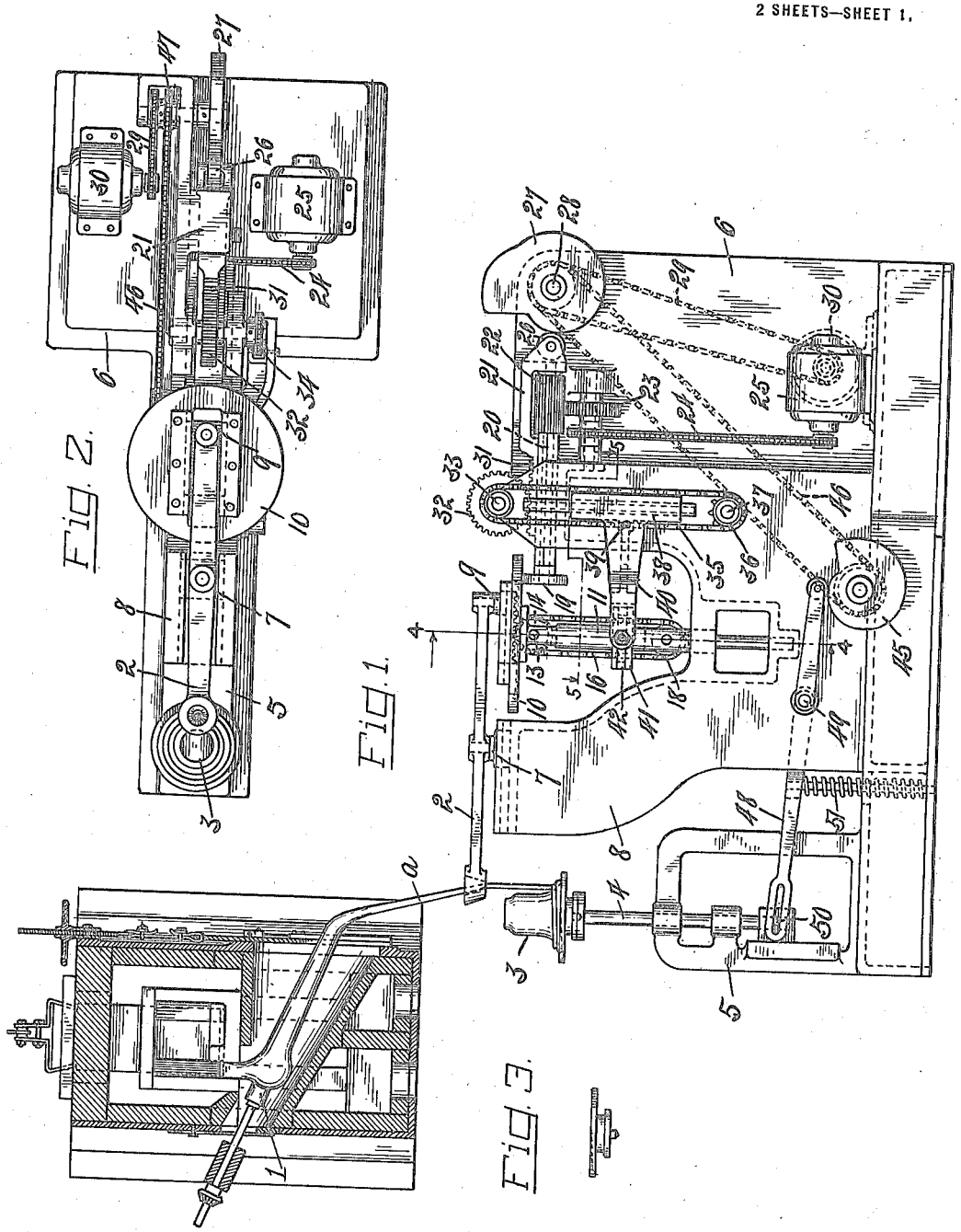

UNITED STATES PATENT OFFICE.

EDWARD DANNER, OF TOLEDO, OHIO.

PROCESS OF FORMING GLASS ARTICLES.

1,269,791.   Specification of Letters Patent.   Patented June 18, 1918.

Application filed July 16, 1917.   Serial No. 180,798.

*To all whom it may concern:*

Be it known that I, EDWARD DANNER, a citizen of the United States, and resident of Toledo, in the county of Lucas and State of Ohio, have invented a certain new and useful Process of Forming Glass Articles; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates particularly to the manufacture of glass articles, and has for its primary object the production of glassware in a simple, rapid and inexpensive manner, by causing a glass bar, column, or the like, to wind around, or forward and backward, or in any other manner, in successive convolutions or layers to form an article of predetermined shape or configuration, the glass being of such consistency that it is in substantially a plastic or semi-plastic state to permit a free flexing or controlling of its course of movement and cohesion of the successive or contacting convolutions or layers to form a homogeneous weld or union therebetween.

The invention is fully described in the following specification, and while it may be practised in numerous ways, two methods only of practising the same are illustrated in the accompanying drawings, in which—

Figure 1 is an elevation of an apparatus in which the glass stream or bar is transversely moved to control the winding or article forming movement thereof. Fig. 2 is a top plan view thereof with the glass flowing means removed. Fig. 3 is a side view of a work supporting table. Fig. 4 is an enlarged section on the line 4—4 in Fig. 1. Fig. 5 is an enlarged section on the line 5—5 in Fig. 1, and Fig. 6 is a side elevation of an apparatus in which the support for the article being formed is moved to control the article forming movement of the glass stream.

In practising my invention the process and apparatus described in my former United States Letters Patent Nos. 1,218,598 and 1,219,709, dated March 6, 1917, and March 20, 1917, respectively, for continuously forming molten glass in cylindrical form (either tube or cane) may be employed and the cylindrical stream of glass flowing from the inclined mandrel thereof deposited in successive layers or plies to form articles of predetermined shapes. One apparatus for performing the process of my said former patents is illustrated in the upper left-hand corner of Fig. 1 and shows molten glass as flowing from a furnace or pot onto an inclined rotating mandrel, winding therearound and flowing from its lower end in a continuous cylindrical stream, the size of which is determined by numerous causes familiar to persons skilled in the art and partially defined in said former Letters Patent. The glass stream may either be of tubular or cane form, and, if of tubular form, air, under a desired pressure, is admitted to the interior thereof through the mandrel.

In the manner of practising my present invention illustrated in Figs. 1 to 5, the glass stream *a*, which flows, in the present instance, from the forming mandrel 1 of the cylinder forming apparatus, passes down through the apertured end of a guide-arm 2 onto a support or form 3 of desired shape, and the movement of this arm is controlled and determined in any suitable manner to cause the stream or column to be deposited on a form or support in successive layers or convolutions to form an article of predetermined shape. The glass stream should remain in a plastic or semi-plastic state until deposited on the support or form to permit an easy flexing thereof and controlling of its movement and a cohesion of the successive or contacting layers to form a homogeneous union therebetween.

The form 3 is removably carried by a standard 4, which is vertically movable in a part 5 of the machine frame 6, by means hereinafter described, so that the distance between the arm 2 and the point of deposit of the stream *a* on the form or article being formed, may be maintained substantially constant.

The arm 2 is fulcrumed intermediate its ends to a slide-block 7 for horizontal oscillatory movements, and said block is mounted in the top of the frame-arm 8 for horizontal reciprocatory movements toward and away from the normal vertical line of flow of the stream *a*. The inner end of the arm 2 has wrist-pin connection with a rack-bar 9, which is mounted on a rotatable disk 10 for longitudinal reciprocatory movements diametrically thereof. The disk 10 is carried at the upper end of a vertical shaft 11.

which is journaled at its lower end in the frame 6. The shaft 11 is provided adjacent to the disk 10 with a recess or opening 12 (Fig. 4) having a shaft 13 extending across the same transverse to the shaft 11 and carrying a pair of pinions 14 in mesh with the rack-bar 9, and a sprocket-wheel 15 between said pinions. A sprocket-chain 16 connects the sprocket-wheel 15 with a subjacent sprocket-wheel 17 mounted in an opening 18 of the shaft 11. It is thus evident that a movement of the rack-bar 9 transverse to the disk 10 is controlled by movements of the chain 16.

A drive-wheel 19 is in frictional driving engagement with the under side of the disk 10 and is carried at one end of a shaft 20, which is journaled in a horizontally disposed longitudinally movable slide-frame 21, that is slidingly mounted in the frame 6 at one side of said disk. A broad gear 22 on the shaft 20 meshes with and is driven by a subjacent gear 23, the shaft of which is journaled in the frame 6 and carries a sprocket-wheel, which is connected by a chain 24 to a sprocket-wheel on a motor 25. The slide-frame 21 is provided at its outer end with an end thrust roller 26 in contact with the periphery of a speed control cam 27, which is mounted on a shaft 28 journaled in the frame 6 and controls the inward and outward movements of the drive-wheel 19 relative to the disk 10. This cam is driven by and has sprocket-wheel and chain connection 29 with a motor 30.

The slide-frame 21 has a rack-bar 31 on its top in mesh with a pinion 32, the shaft 33 of which is journaled in the frame 6 and carries a sprocket-wheel 34. This wheel is connected by a chain 35 to a subjacent sprocket-wheel 36 mounted on a shaft 37 projecting from a side of the frame 6.

A slide-block 38 is guided for vertical movements at a side of the frame 6 and is connected at one side to the chain 35, as at 39, so that the weight of the slide-block will normally move the chain and turn the pinion 32 in a direction to force the slide-frame toward the cam-wheel 27. When the slide-frame 21 is positively moved inward by the cam-wheel 27 the sprocket-chain 35 is moved in a direction to effect a raising of the slide-block 38.

The movements of the slide-block 38 are utilized to control the movements of the sprocket-chain 16 and the consequent transverse movements of the rack-bar 9 relative to the disk 10, and for such purpose the block 38 is provided with an arm 40, which is forked at its outer end (Figs. 4 and 5) to adapt it to straddle a grooved collar 41, that is fixed to the shaft 11 to turn therewith and forms an annular race for a ring 42 with which the furcations of the arm 40 are connected by screws 43. The chain 16 extends through registering openings in the collar 41 and is fixed at one side thereof, as at 44, to said collar to cause the collar to move therewith. It is thus evident that as the slide-frame 21 is moved to vary the speed of driving of the disk 10 the chain 16 will also be moved to shift the rack-bar 9 and vary the radial distance between the wrist-pin of the arm 2 and the axis of the disk 10. The adjustment of the rack-bar 9 varies the throw of the arm 2 in accordance with the changing diameter of the form about which the article is being shaped, and inasmuch as the flow of the glass stream $a$ is approximately uniform the speed of gyration or orbital movement of the free end of the arm 2 around the axis of the form 3 must be increased or diminished as the diameter of the form about which the stream winds varies. In other words, the speed of orbital or gyrating movement of the free end of the arm 2 need not be as great when the stream is being deposited in a large convolution as when being deposited in a smaller convolution. It is thus evident that a variation in the throw of the arm 2 must be compensated for by a corresponding variation in the speed of driving of the disk 10.

The distance between the apertured end of the guide-arm 2 and point at which the stream $a$ meets or has contact with the article being formed is determined by a cam-wheel 45, which has its shaft journaled in the lower portion of the frame 6 and carrying a sprocket-wheel that is connected by a sprocket-chain 46 with a sprocket-wheel 47 on the shaft 28, which carries the cam-wheel 27. A lever 48 is fulcrumed in the frame 6, as at 49, and has its inner end provided with a roller, which rides on the top of the cam-wheel 45 and has its outer end provided with a slot and disposed in position for such slot to receive a pin 50 projecting from the lower end of the standard 4. A coiled compression spring 51 bears up under the outer arm of the lever 48 and exerts a raising pressure on the standard supporting arm of the lever. The cam-wheel 45 is intended to make one revolution for each article that is formed, and during the forming of an article causes a gradual lowering of the form 3. The cam-wheel 27 is also adapted to make one revolution for each article that is formed.

In the apparatus illustrated in Fig. 6 the guide-arm for the glass stream, if such arm is employed at all, is stationary and the mold or support for the article being formed is intended to have movement to cause the glass stream to be deposited thereon in predetermined shape. In this form of apparatus the mold or support 60 for the article being formed is removably supported at the upper end of a vertical shaft 61 and the glass stream $a$ flows onto said form or support through a registering aperture in an arm 62, which fixedly projects from the machine frame 63. The shaft 61 is splined through a pinion 64 for vertical sliding movements therethrough and this pinion meshes with a pinion 65, the shaft of which carries one of a pair of miter gears 66, the other of which is mounted on the end of a shaft 67. The upright shaft 61, shaft 67 and connection therebetween are carried by a slide-frame 68, which is mounted on a part of the frame 63 for sliding movements toward and away from the same. The shaft 67 has sliding connection with an extension shaft 69, which is journaled in the frame 63 and has bevel-gear connection 70 with an upright shaft 71 journaled in the frame 63 and carrying a friction disk 72 at its upper end. The means for driving the disk 72 is substantially the same as that described in connection with the other apparatus disclosed, and embodies a drive-wheel 73, the shaft of which is carried by the slide-frame 74 and has connection with a motor 75. The sliding movements of the wheel 73 radially of the disk 72 are controlled by a cam-wheel 76, which has peripheral engagement with the end of the slide and is driven from a motor 77, the same as described in connection with said former apparatus.

The slide-frame 74 has a rack-bar 78 in driving mesh with a pinion 79, on the shaft with which is mounted a sprocket-wheel 80, which is connected by a chain 81 to a sprocket-wheel 82 mounted on a shaft 83 at the lower portion of the frame 63. The shaft 83 has gear and pinion connection 84 with a rack-bar 85, which is slidingly mounted in the lower portion of the frame 63 and is connected by a link 86 with the slide-frame 68. It is thus evident that a shifting of the slide-frame 74 to vary the speed of rotation of the form 60 will communicate a predetermined shifting movement to the slide-frame 68 to move the axis of the form 60 or article being formed toward or away from the line of vertical flow of the stream $a$. The operating of the speed change means and the shifting means for the slide-frame 68 in unison causes the speed of driving of the form 60 to be uniformly quickened as the axis of the form is moved toward the vertical glass stream to shorten the radii of the article being formed. An expansion spring 87 exerts an end thrust against the rack-bar 85 and tends to move the mechanism, which is actuated by the cam 76, in a reverse direction to that effected by the cam.

The vertical movements of the form 60 are controlled in the same manner as described in connection with the former apparatus and therefore need not be again described.

It is evident that the winding apparatus herein illustrated and described or any other apparatus suitable for the purpose may be designed to suit the requirements of the articles to be formed and to suit the conditions and requirements of the apparatus used to furnish the molten glass in cylindrical, tubular or other form for winding, and that the article may be formed by allowing the stream of glass to shape itself around a core or form disposed in vertical, horizontal, or other position, or it may be deposited on a support which is not provided with a core, as illustrated in Fig. 3.

With the apparatus illustrated it is not necessary to continuously wind the glass stream to maintain it of uniform size and consistency, for with this form the glass can be used in a more plastic state and can be allowed to flow from the end of the mandrel by gravity, without the aid of any drawing action, and wound at the same rate of speed as that of the flow. It is preferable, however, if a core or form having a reclining axis is employed, to cause the winding action of the core to exert a slight pull on the glass stream or column to stretch it to desired size.

In designing apparatus for winding glass from any source of supply it will be preferable to provide means to vary the speed of winding and the feed of the glass independent of each other so that the relations may be set to meet requirements.

The starting and finishing ends of the winding for each article may be reheated and drawn to a taper and caused to cohere to the article, or may be given a finished form in any other suitable manner to produce an article of neat appearance and desired shape. It is evident that an article may be entirely or partially formed or added to by my process, and in the latter case the article to be added to should be reheated to the proper temperature for effecting a homogeneous union between the parts.

In practising my process it is preferable to anneal all articles produced thereby in order to equalize the strain set up in the glass due to unequal cooling, unequal temperatures of the glass at the points of cohesion, and other causes, and thereby prevent cracking and bursting of the article. It is also preferable with some work, such, for instance, as large pieces and some shapes, to keep the article in a heated chamber or atmosphere while being formed, the amount of heat to be regulated depending on the size and shape of the article being formed. Such heated chamber is illustrated in Fig. 6 and designated 88.

It is evident that articles of numerous and elaborate or plain shapes may be produced in a simple, rapid and inexpensive manner by my process, and that many of such shapes could not be produced by the hand blown or other methods in use at the present time.

I wish it understood that the description and drawings contained herein are merely illustrative of two forms of practising my invention, and are not intended to limit or restrict the scope of the invention, which contemplates broadly the forming of glass articles of whatsoever shape, over a form or otherwise, by flowing or depositing a cylindrical stream or column of glass in a manner to cause a gradual building up or extending of the article wall by the depositing of successive connected or contacting layers of the glass one on or against the next in order, the glass stream being sufficiently heated or plastic to permit a free flexing of the stream and cohesion of the successive layers at their points of contact. It will also be understood that the practising of my invention is not limited to the use of any particular apparatus or to any particular manner of forming the glass stream and flowing it onto the form or article support, or to the use of one stream or column, as several streams or columns may be simultaneously employed, if desired, in producing an article.

Having thus described my invention, what I claim as new, and desire to secure by Letters Patent, is—

1. The process of forming glassware, which consists in directing a stream of glass to form successive contacting layers which coöperate to produce an article of predetermined shape, the glass stream being sufficiently plastic to permit a cohesion of the successive layers at the points of contact.

2. The process of forming glassware, which consists in depositing a stream of glass in successive layers in contact one with another to form an article of predetermined shape, the glass being sufficiently plastic to permit a flexing thereof and a cohesion of the contacting portions of the layers.

3. The process of forming glass articles, which consists in depositing a glass column in a heated cohesive state in successive layers one in contact with another to form an article of predetermined shape.

4. The process of forming glass articles, which consists in winding a glass column in a heated cohesive state in successive layers one in contact with another to form an article of predetermined shape.

5. The process of forming glass articles, which consists in winding a glass bar in a heated cohesive state around a form in successive contacting layers to produce an article of predetermined shape.

6. The process of forming glass articles, which consists in flowing a glass stream of cylindrical form in a heated cohesive state in successive contacting layers around a form to produce an article of predetermined shape.

7. The process of forming glass articles, which consists in depositing a glass column in a heated cohesive state in successive contacting layers to form an article of predetermined shape, the depositing taking place in the presence of heat.

8. The process of forming glass articles, which consists in winding a glass column in a flexible and cohesive state in successive contacting layers to form an article of predetermined shape, such winding taking place in the presence of heat.

9. The process of producing glass articles, which consists in depositing a continuous stream of glass in a plastic state in successive contacting layers to form a homogeneous article of predetermined shape.

10. The process of forming glass articles, which consists in flowing a stream of glass in partially congealed cylindrical form from a source of molten glass supply, and depositing such stream in continuous successive layers one in contact with another to form an article of predetermined shape.

11. The process of producing glass articles, which consists in winding a glass column in a flexible cohesive state in successive contacting layers around a form having a varying diameter lengthwise of its axis, and increasing the speed of winding in proportion to the reduction of the diameter of the form at the portion thereof where winding occurs.

12. The process of producing glass articles, which consists in flowing a column of glass in a flexible cohesive state from a source of supply in successive contacting layers around a form to produce an article of predetermined shape, and lowering the form with respect to the source of supply as the winding progresses to maintain the distance between the source of supply and the point on the form with which the column first has contact approximately constant.

13. The process of producing glass articles, which consists in winding a glass column in a flexible cohesive state in successive contacting layers to form an article of predetermined shape having a varying diameter lengthwise of its axis, and increasing and diminishing the speed of winding with the diminishing or increasing, respectively, of the article diameter.

14. The process of producing glass articles, which consists in flowing a column of glass in a flexible cohesive state from a source of supply in successive contacting layers to form an article of predetermined shape, and lowering the article with respect to the source of supply as the winding progresses to maintain the distance between the source of supply and the point of connection of the column with the article approximity constant.

15. The process of forming glass articles, which consists in forming molten glass in column form and winding the column, while still in a cohesive state, in successive contacting layers, about a form to produce an article of predetermined shape.

16. The process of forming glass articles, which consists in forming molten glass in column form and manipulating the column, while still in a cohesive state, to form successive laterally contacting layers of predetermined configuration, and severing the column from the article when completed.

In testimony whereof, I have hereunto signed my name to this specification.

EDWARD DANNER.